US007475682B2

(12) United States Patent
Galtier et al.

(10) Patent No.: US 7,475,682 B2
(45) Date of Patent: Jan. 13, 2009

(54) METHOD FOR DETERMINING THE PHASING OF AN INTERNAL COMBUSTION ENGINE

(75) Inventors: Frédéric Galtier, Montpellier (FR); Bruno Nicolas, Seysses (FR); Cédric Vedel, Cugnaux (FR); Franz Dietl, Lappersdorf (DE)

(73) Assignee: Continental Automotive France, Toulouse (FR)

( * ) Notice: Subject to any disclaimer, the term of this patent is extended or adjusted under 35 U.S.C. 154(b) by 0 days.

(21) Appl. No.: 11/665,608

(22) PCT Filed: Oct. 19, 2005

(86) PCT No.: PCT/EP2005/011219

§ 371 (c)(1), (2), (4) Date: May 15, 2007

(87) PCT Pub. No.: WO2006/042747

PCT Pub. Date: Apr. 27, 2006

(65) Prior Publication Data

US 2007/0292120 A1 Dec. 20, 2007

(30) Foreign Application Priority Data

Oct. 20, 2004 (FR) .................................. 04 11121

(51) Int. Cl.
*F02P 9/00* (2006.01)
*G01L 3/26* (2006.01)

(52) U.S. Cl. ..................... 123/612; 123/614; 73/114.01

(58) Field of Classification Search ................. 123/612, 123/613, 614; 73/116, 117.2, 117.3
See application file for complete search history.

(56) References Cited

U.S. PATENT DOCUMENTS

| | | | | |
|---|---|---|---|---|
| 5,469,823 | A | 11/1995 | Ott et al. | |
| 5,871,002 | A * | 2/1999 | Nada | 123/609 |
| 6,367,446 | B1 * | 4/2002 | Kanamaru et al. | 123/339.12 |
| 7,310,574 | B2 * | 12/2007 | Di Cola et al. | 701/103 |

FOREIGN PATENT DOCUMENTS

| | | |
|---|---|---|
| EP | 4310460 | 10/1994 |
| EP | 10246224 | 4/2004 |

* cited by examiner

*Primary Examiner*—John T Kwon
(74) *Attorney, Agent, or Firm*—Young & Thompson

(57) ABSTRACT

Method for determining the timing of an indirect injection internal combustion engine, in which the following steps are performed:

use is made of a first sensor (2) including a target (6) connected to the crankshaft and having a plurality of marks (8), use is made of a second sensor (12) including a target (16) connected to the camshaft and having:

a plurality of teeth ($D_1$, $D_2$, $D_3$), a plurality of gaps ($C_1$, $C_2$, $C_3$), and a plurality of fronts ($F_1$, $F_2$, $F_3$, $F_4$, $F_5$, $F_6$) separating the teeth ($D_1$, $D_2$, $D_3$) and the gaps ($C_1$, $C_2$, $C_3$), the engine is turned over from a starting position, the marks (8) on the target (6) of the first sensor (2)are counted, the fronts ($F_1$, $F_2$, $F_3$, $F_4$, $F_5$, $F_6$) on the target of the second sensor are detected, this is used to deduce the engine timing.

20 Claims, 1 Drawing Sheet

METHOD FOR DETERMINING THE PHASING OF AN INTERNAL COMBUSTION ENGINE

BACKGROUND OF THE INVENTION

The invention is aimed at determining the timing of an internal combustion engine comprising a crankshaft and a camshaft. More specifically, it is an object of the invention to determine this reliably and in a short space of time during a start-up sequence. Engine timing is to be understood as determining the physical location of the cylinders of the engine and how they are positioned in the engine cycle (admission stroke, compression stroke, etc.). This timing is commonly determined in relation to the crankshaft or the camshaft, the positions of which are associated with those of the cylinders.

The invention is quite particularly intended for vehicles equipped with such an engine and will be described more specifically in relation to such an application.

SUMMARY OF THE INVENTION

When the engine is not running, the position of the engine, and more specifically of the crankshaft, is not generally known, at least not accurately, which means that during the engine start-up phase it is necessary first of all to work out the engine timing before injecting fuel or at least prior to ignition.

The object of the invention is to reduce the time that this timing operation requires. In order to achieve this, according to the invention, the following steps are performed:

- use is made of a first sensor comprising a stationary part and a target connected to the crankshaft, said target comprising a plurality of uniformly distributed marks and the stationary part detecting these marks,
- use is made of a second sensor comprising a stationary part and a target connected to the camshaft, said target having a more or less circular cross section and comprising:
  - a plurality of teeth extending over angular sectors of different magnitudes,
  - a plurality of gaps extending over angular sectors of different magnitudes, and
  - a plurality of fronts separating the teeth and the gaps, the stationary part detecting the teeth, the gaps and the fronts on the target,

- the engine is turned over from a starting position,
- the marks on the target of the first sensor are detected,
- the marks detected on the target of the first sensor are counted,
- the fronts on the target of the second sensor are detected,
- then this is used to deduce the engine timing.

Thus, the crank angle is easily and accurately determined with relation to the detection of the fronts on the target of the second sensor. The timing is therefore determined simply, quickly and reliably.

In order to quickly determine the engine timing according to the invention, the target of the second sensor comprises at least three teeth and three gaps.

In order further to reduce the time needed to determine the timing, without increasing the number of marks on the target of the first sensor, according to the invention the length of the teeth and of the gaps on the target of the second sensor is measured in non-integer fractions of marks on the target of the first sensor.

According to a characteristic of the invention, the number of marks detected on the target of the first sensor between the time that two successive fronts are detected on the target of the second sensor are counted and the number of marks counted between two successive fronts is correlated with the engine timing.

Since the various teeth and the various gaps on the target of the second sensor have different angular magnitudes, determining the magnitude of a tooth or of a gap allows that tooth or that gap to be identified and therefore allows one engine position to be correlated with each measured magnitude.

According to one characteristic of the invention, the following operations are performed:

- the target of the first sensor is equipped with a reference index that can be detected by the stationary part,
- the number of marks detected on the target of the first sensor from the starting position is counted,
- if the reference index on the target of the first sensor is detected before a front on the target of the second sensor is detected, then the number of marks counted on the target of the first sensor from the starting position until such time as the reference index is detected is compared against a reference threshold, and if it is below said reference threshold then this is used to deduce the engine timing.

Detection of the reference index gives rise to uncertainty between two possible engine timings. When that one of the two for which a front would have been detected on the target of the first sensor before the reference index was detected on the target of the first sensor can be excluded, the only possible timing is obtained.

According to another characteristic of the invention, the following operations are performed:

- the target of the first sensor is equipped with a reference index that can be detected by the stationary part,
- the number of marks detected on the target of the first sensor from the time each front is detected on the target of the second sensor is counted,
- if the reference index on the target of the first sensor is detected before the next front on the target of the second sensor is detected, then the number of marks counted from detection of the front on the target of the second sensor until such time as the reference index on the target of the first sensor is detected is correlated with the engine timing.

By ensuring that there is a different number of marks on the target of the first sensor separating detection of the reference index on the target of the first sensor and prior detection of a front on the target of the second sensor for the two timings that correspond to the detection of the reference index, the engine timing can then be determined without any ambiguity.

According to another characteristic of the invention, the following operations are performed:

- the target of the first sensor is equipped with a reference index that can be detected by the stationary part,
- the reference index on the target of the first sensor is detected,
- the number of marks detected on the target of the first sensor from the reference index on the target of the first sensor until such time as a front is detected on the target of the second sensor is counted,
- the number of marks counted from the reference index on the target of the first sensor until such time as a front is detected on the target of the second sensor is correlated with the engine timing.

Likewise, an engine timing correlates with each number of marks counted which means that the engine timing is thus determined reliably.

According to yet another characteristic of the invention, the following operations are performed:

the number of marks detected on the target of the first sensor from the starting position until such time as a front is detected on the target of the second sensor is counted, the number of marks counted on the target of the first sensor from the starting position until such time as a front is detected on the target of the second sensor is compared against a front threshold and if it is above said front threshold, then this is used to deduce the engine timing.

Thus, if the number of marks counted reaches a high enough value for which it can correlate only with the magnitude of just one tooth or just one gap, then this can be used to deduce the engine timing with no ambiguity.

According to another characteristic of the invention, it determines whether the stationary part of the second sensor is detecting a tooth or a gap in order to deduce the engine timing.

Determination of the engine timing is thus easier and improved.

In order to detect any possible anomaly, according to the invention the following steps are performed:

as long as no front has been detected on the target of the second sensor, the number of marks detected on the target of the first sensor from the starting position is counted, and the number of marks counted on the target of the first sensor from the starting position is compared against a validity threshold and if it is above the validity threshold then it is considered that it is impossible to determine the engine timing.

Thus, in particular, failure of one of the sensors, causing a tooth or gap magnitude as counted to be greater than it would in reality be, is detected.

BRIEF DESCRIPTION OF THE SEVERAL VIEWS OF THE DRAWINGS

The invention will become more clearly apparent through the description which follows, given with reference to the attached drawings in which.

DETAILED DESCRIPTION OF THE PREFERRED EMBODIMENTS

Figure 1:
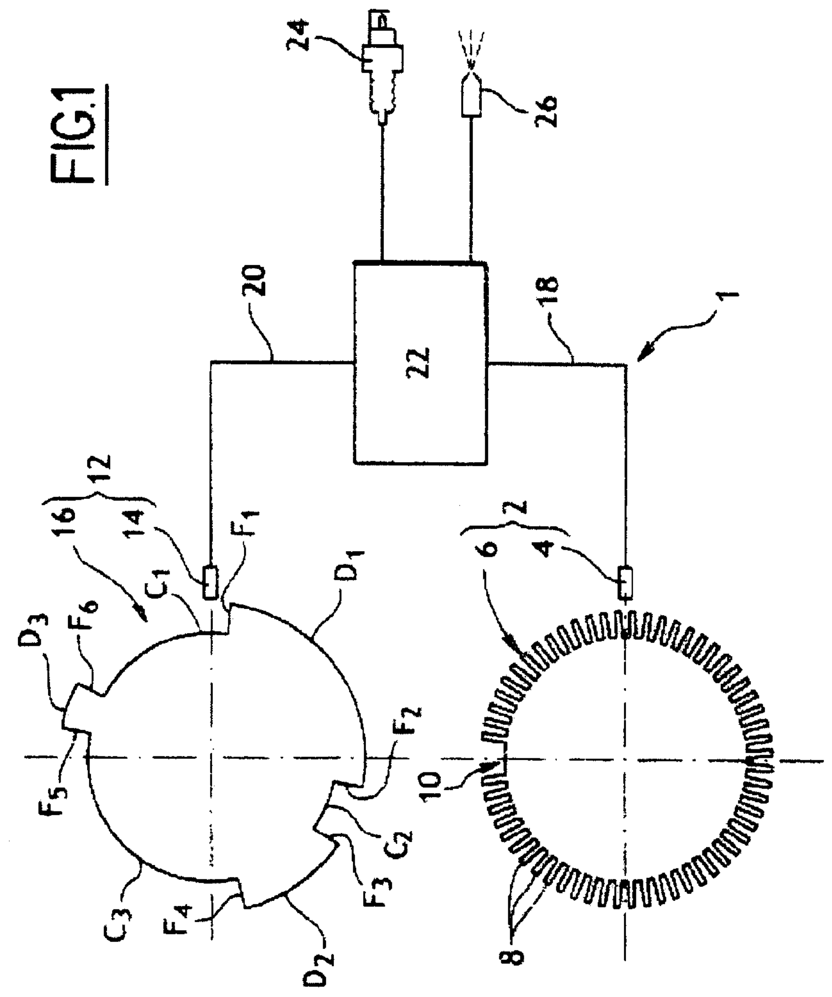
FIG. 1 is a schematic depiction of a device for implementing a method according to the invention.

The device 1 illustrated in FIG. 1 essentially comprises a crankshaft sensor 2, a camshaft sensor 12 and a control unit 22. The control unit 22 receives a signal 18 from the crankshaft sensor 2, a signal 20 from the camshaft sensor 12 and controls the spark plugs 24 (just one has been depicted) and injectors 26 (just one has been depicted).

This device is intended to be fitted to a controlled-ignition gasoline engine with indirect fuel injection, equipped with a crankshaft and at least one camshaft.

The crankshaft sensor 2 comprises a target 6 that has 60 uniformly distributed teeth 8 and is secured to the crankshaft, and a stationary part 4 detecting the teeth 8 on the target 6. The teeth 8 constitute marks positioned every 6 degrees (in the embodiment shown) and separated by gaps. The target 6 more specifically has 58 teeth, as two consecutive teeth have actually been eliminated in order to form a reference index 10 allowing the crankshaft position to be determined.

The camshaft sensor 12 comprises a target 16 secured to the camshaft and a stationary part 14. The target 16 has a cross section that is circular overall and exhibits three teeth $D_1$, $D_2$, $D_3$ and three gaps $C_1$, $C_2$, $C_3$. The teeth and the gaps are separated by fronts $F_1$, $F_2$, $F_3$, $F_4$, $F_5$, $F_6$. The teeth $D_1$, $D_2$, $D_3$ have angular magnitudes that differ from one another and are respectively 90 degrees, 40 degrees and 20 degrees in the embodiment presented. The gaps $C_1$, $C_2$, $C_3$ have magnitudes that differ from one another and are respectively 70 degrees, 25 degrees and 115 degrees.

Figure 2:
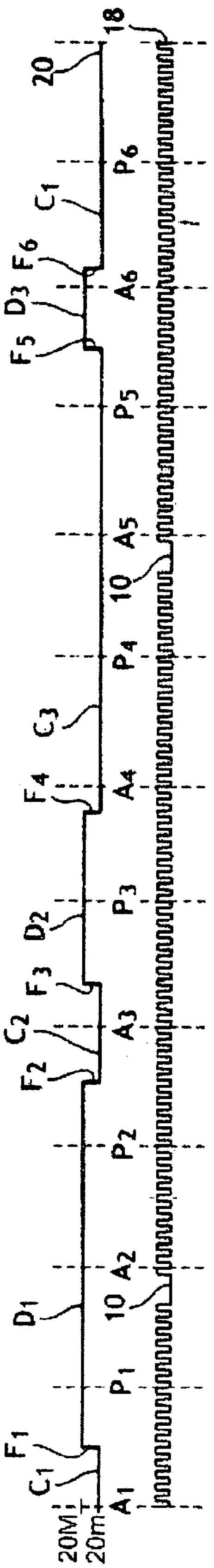
FIG. 2 is a representation of the signals picked up by the sensors of the device of FIG. 1.

FIG. 2 represents the signals 18, 20 picked up by the crankshaft sensor 2 and by the camshaft sensor 12 over one engine cycle. In the embodiment presented, the teeth 8 of the target 6 are all of the same height, as are the gaps on the target 6, and the teeth $D_1$, $D_2$, $D_3$ and the gaps $C_1$, $C_2$, $C_3$ on the target 16, and so the signals 18 and 20 are both binary signals alternately adopting a high value corresponding to the detection of a tooth and a low value corresponding to the detection of a gap. The camshaft rotates at half the speed of the crankshaft. The signal 18 illustrated in FIG. 2 therefore corresponds to two revolutions of the target 6 and the signal 20 to just one revolution of the target 16.

Given the foregoing, the angular magnitude of the teeth $D_1$, $D_2$, $D_3$ on the target 16 corresponds respectively to 30 teeth, 13⅓ teeth and 6⅔ teeth, while the magnitude of the gaps $C_1$, $C_2$, $C_3$ on the target 16 corresponds respectively to 23⅓ teeth, 8⅓ teeth and 38⅓ teeth.

The engine comprises six cylinders and therefore six corresponding top dead centers. It therefore has six preferred stopping positions $A_1$, $A_2$, $A_3$, $A_4$, $A_5$, $A_6$ more or less equidistant from two consecutive top dead centers.

It has in fact been noticed that an engine, as it stops, positions itself in a position of equilibrium and that this position happens to be more or less equal distances from two consecutive top dead centers of one of the pistons. It is these positions that are termed the "preferred stopping positions". There is, however, a certain margin of uncertainty around these preferred stopping positions as regards the position in which the engine has actually stopped.

It is known by construction that having detected the front $F_1$, the stationary part 4 of the sensor 2 detects twelve of the teeth 8 before detecting the reference index 10 on the target 6 and that having detected the front $F_4$, the stationary part 4 of the sensor 2 detects twenty teeth 8 before detecting the reference index 10 on the target 6. It is also known on the one hand that when the sensor 2 detects the reference index 10 and the signal 20 adopts the high value $\mathbf{20}_M$, the engine is between top dead center $P_1$ and top dead center $P_2$ and, on the other hand, that when the sensor 2 detects the reference index 10 and the signal 20 adopts the low value $\mathbf{20}_m$, the engine is between top dead center $P_4$ and top dead center $P_5$. All these data are stored in the control unit 22.

The control unit 22 gathers information from the sensors 2 and 12 and determines the engine timing by comparing the information from the sensors 2 and 12 against the aforementioned stored information.

When the engine is turned over in order to start it from a starting position corresponding to the preferred stopping position $A_1$, as illustrated in FIG. 2, the sensor 2 detects five teeth 8 on the target 6 before the sensor 12 detects the front $F_1$, then detects a further twelve teeth 8 before detecting the reference index 10. After detecting the front $F_1$, the control unit 22 determines whether this front is the front $F_1$, the front $F_3$ or the front $F_5$ from the fact that the signal 20 switches from the value $\mathbf{20}_m$ to the value $\mathbf{20}_M$. After detecting the reference index 10, the control unit 22 determines that this is the reference index 10 situated between top dead center $P_1$ and top dead center $P_2$ from the fact that it comes twelve teeth after the detection of a front by the sensor 12 and the fact that the signal 20 is at the value $\mathbf{20}_M$. The engine timing is therefore known and the control unit 22 can therefore command the injection of fuel, followed by ignition in the various cylinders according to a determined sequence.

When the engine is turned over in order to start it from a starting position corresponding to the preferred stopping position $A_2$, the sensor 2 detects sixteen teeth 8 on the target 6 before the sensor 12 detects the front $F_2$, then a further 8⅓ teeth 8 before detecting the front $F_3$. After the front $F_2$ has been detected, the control unit 22 determines whether this is the front $F_2$, the front $F_4$ or the front $F_6$ from the fact that the signal 20 switches from the value $\mathbf{20}_M$ to the value $\mathbf{20}_m$. Once the front $F_3$ has been detected, the control unit 22 determines that this is the front $F_3$ because it comes 8⅓ teeth 8 after the sensor 12 detects a front and because the signal 20 switches from the value $\mathbf{20}_m$ to the value $\mathbf{20}_M$.

From a starting position corresponding to the preferred stopping position $A_3$, the sensor 2 detects three teeth 8 on the target 6 before the sensor 12 detects the front $F_3$, then detects a further 13⅓ teeth 8 before the front $F_4$ is detected. Once the front $F_4$ has been detected, the control unit 22 determines that this is the front $F_4$ because it comes 13⅓ teeth 8 after the sensor 12 detects a front and because the signal 20 switches from the value $\mathbf{20}_M$ to the value $\mathbf{20}_m$.

From a starting position corresponding to the preferred stopping position $A_4$, the sensor 2 detects eighteen teeth 8 before the reference index 10 is detected. The control unit 22 determines that this is the reference index 10 situated between top dead center $P_4$ and top dead center $P_5$ because the signal 20 has the value $\mathbf{20}_m$ and no front has been detected for over twelve teeth 8.

The engine timing is confirmed when the front $F_5$ is detected. Specifically, since the signal 20 has kept the value $\mathbf{20}_m$ while the sensor 2 was detecting in excess of 23⅓ consecutive teeth (thirty-four teeth in our particular instance) before the front $F_5$ was detected and the magnitude of the gaps $C_1$ and $C_2$ is 23⅓ and 8⅓ teeth respectively, this can only be the front $F_5$.

From a starting position corresponding to the preferred stopping position $A_5$, the sensor 2 detects fifteen teeth 8 on the target 6 before the sensor 12 detects the front $F_5$ then detects a further 13⅓ teeth 8 before the front $F_6$ is detected. Once the front $F_6$ has been detected, the control unit 22 determines that this is the front $F_6$ because it lies 6⅔ teeth 8 after the sensor 12 detects a front and because the sensor 20 switches from the value $\mathbf{20}_M$ to the value $\mathbf{20}_m$.

From a starting position corresponding to the preferred stopping position $A_6$, the sensor 2 detects two teeth 8 on the target 6 before the sensor 12 detects the front $F_6$, then detects a further 23⅓ teeth 8 before the front $F_1$ is detected. Once the front $F_6$ has been detected, the control unit 22 determines whether this is the front $F_2$, the front $F_4$ or the front $F_6$ from the fact that the signal 20 has switched from the value $\mathbf{20}_M$ to the value $\mathbf{20}_m$. Twenty-one teeth after detecting the front $F_6$, the control unit 22 determines that this was front $F_6$ because no reference index 10 has been detected, and the decision is confirmed 23⅓ teeth 8 after the detection of the front $F_6$ when the sensor 12 detects a front and the signal 20 switches from the value $\mathbf{20}_m$ to the value $\mathbf{20}_M$.

Were the sensor 2 to detect in excess of 38⅓ teeth 8 without the sensor 12 detecting any front at all, the control unit 22 would determine that there was an anomaly with the sensor 14 or with the target 16, because no tooth and no gap has such a magnitude.

Of course, when the control unit 22 carries out tests, it is possible to build in an adjustable margin of error of 1 or more teeth.

The embodiment presented comprises a camshaft target 16 equipped with three teeth and three gaps. The method according to the present invention applies just as effectively to any type of target simply by applying the knowledge of one skilled in that art without in any way departing from the scope of the present invention.

The invention claimed is:

1. A method for determining, during a start-up phase, the timing of an indirect injection internal combustion engine comprising a crankshaft and a camshaft, in which the following steps are performed:

turning over the engine from a starting position (A1, A2, A3, A4, A5, A6);

detecting a plurality of uniformly distributed marks (8) of a first target (6) of a first sensor (2), the first sensor comprising a first stationary part (4) and the first target (6) connected to the crankshaft;

detecting at least one of a plurality of fronts (F1, F2, F3, F4, F5, F6) of a second target (16) of a second sensor (12), the second sensor comprising a second stationary part (14) and the second target (16) connected to the camshaft, said second target having a more or less circular cross section and comprises:

a plurality of teeth (D1, D2, D3) extending over angular sectors of different magnitudes, a plurality of gaps (C1, C2, C3) extending over angular sectors of different magnitudes, and the plurality of fronts (F1, F2, F3, F4, F5, F6) separating the teeth (D1, D2, D3) and the gaps (C1, C2, C3), the second stationary part (14) configured to detect the teeth (D1, D2, D3), the gaps (C1, C2, C3) and the fronts (F1, F2, F3, F4, F5, F6) on the second target (16);

detecting, on the first target (6), a reference index (10) detectable by the first stationary part (4);

counting the marks (8) detected on the first target (6) from the starting position (A1, A2, A3, A4, A5, A6);

if the reference index (10) on the first target (6) is detected by the first stationary part (4) before a front (F1, F2, F3, F4, F5, F6) is detected on the second target (16) by the second stationary part (14), then comparing a number of marks (8) counted between the starting position and the detection of the reference index (10) against a reference threshold; and if the counted number of marks is greater than said reference threshold, then deducing the engine timing with the counted number of marks.

2. The method as claimed in claim 1, wherein, a number of marks (8) on the first target (6) are detected from a detection of a first front on the second target (16), and if the reference index (10) on the first target (6) is detected before a detection of a second front on the second target (16) following the first front, then a count of the number of marks (8) detected between the detection of the first front and the detection of the reference index (10) on the first target (6) is correlated with the engine timing.

3. The method as claimed in claim 1, wherein, the reference index (10) on the first target (6) is detected, and a number of marks (8) detected on the first target (6) between the detection of the reference index (10) on the first target (6) and a detection of a front (F1, F2, F3, F4, F5, F6) on the second target (16) is counted and correlated with the engine timing.

4. The method as claimed in claim 2, wherein, the reference index (10) on the first target (6) is detected, and a number of marks (8) detected on the first target (6) between the detection of the reference index (10) on the first target (6) and a detection of a front (F1, F2, F3, F4, F5, F6) on the second target (16) is counted and correlated with the engine timing.

5. The method as claimed in claim 1, wherein, a number of marks (8) detected on the first target (6) from the starting position (A1, A2, A3, A4, A5, A6) until a detection of a front (F1, F2, F3, F4, F5, F6) on the second target (16) is counted as another counted number, the another counted number is compared against a front threshold, and if the another counted number of marks (8) is greater than said front threshold, then the engine timing is deduced with the another counted number of marks.

6. The method as claimed in claim 1, further comprising a step of determining whether the second stationary part (l4) detects a tooth (D1, D2, D3) or a gap (C1, C2, C3) in order to deduce the engine timing.

7. The method as claimed in claim 1, wherein as long as no front (F1, F2, F3, F4, FS, F6) has been detected on the second target (16), the number of marks (8) detected on the first target (6) from the starting position (A1, A2, A3, A4, A5, A6) is counted, the number of marks (8) counted on the first target (6) from the starting position (A1, A2, A3, A4, A5, A6) is compared against a validity threshold, and if the number of marks (8) counted on the first target (6) from the starting position is greater than the validity threshold then a consideration is made that determining the engine timing is not possible.

8. The method as claimed in claim 1, wherein the magnitude of the teeth and of the gaps on the second target is measured in non-integer fractions of marks (8) on the first target (6).

9. The method as claimed in claim 1, wherein the second target (16) is equipped with at least three teeth (D1, D2, D3) and three gaps (C1, C2, C3).

10. The method as claimed in claim 2, wherein, a number of marks (8) detected on the first target (6), from the starting position (A1, A2, A3, A4, A5, A6) until a detection of a front (F1, F2, F3, F4, F5, F6) on the second target (16), is counted as another counted number, the another counted number of marks (8) is compared against a front threshold, and if the another counted number of marks (8) is greater than said front threshold, then the engine timing is deduced with the another counted number of marks.

11. The method as claimed in claim 2, further comprising a step of determining whether the second stationary part (14) detects a tooth (D1, D2, D3) or a gap (C1, C2, C3) in order to deduce the engine timing.

12. The method as claimed in claim 2, wherein as long as no front (F1, F2, F3, F4, F5, F6) has been detected on the second target (16), the number of marks (8) detected on the first target (6) from the starting position (A1, A2, A3, A4, A5, A6) is counted, and the number of marks (8) counted on the first target (6) from the starting position (A1, A2, A3, A4, A5, A6) is compared against a validity threshold, and if the number of marks (8) counted on the first target (6) from the starting position is above the validity threshold then a consideration is made that determining the engine timing is not possible.

13. The method as claimed in claim 2, wherein the magnitude of the teeth and of the gaps on the second target is measured in non-integer fractions of marks (8) on the first target (6).

14. The method as claimed in claim 2, the second target (16) is equipped with at least three teeth (D1, D2, D3) and three gaps (C1, C2, C3).

15. A method for determining, during a start-up phase, the timing of an indirect injection internal combustion engine comprising a crankshaft, a camshaft, and a control unit, the method comprising the steps of:

turning over the engine from a starting position (A1, A2, A3, A4, A5, A6);

detecting a plurality of uniformly distributed marks (8) detected on a first target (6) of a first sensor (2);

detecting a reference index (10) of the first target (6);

detecting at least one of a plurality of fronts (F1, F2, F3, F4, F5, F6) of a second target (16) of a second sensor (12);

recording, at the control unit, if the reference index is detected prior to the detection of one of the plurality of fronts, a first count of the marks (8) detected between the starting position and the detecting of the reference target (6); and if the first count is greater than a reference threshold, calculating and storing the engine timing at the control unit, wherein, the first sensor comprises a first stationary part (4) and the first target (6) connected to the crankshaft, the first stationary part (4) configured to detect the distributed marks (8) and the reference index (10) of the first target (6), the second sensor comprises a second stationary part (14) and the second target (16) connected to the camshaft, the second target (16) has a roughly circular cross section, the second target comprises i) a plurality of teeth (D1, D2, D3) extending over angular sectors of different magnitudes, and ii) a plurality of gaps (C1, C2, C3) extending over angular sectors of different magnitudes, whereby the plurality of fronts (F1, F2, F2, F4, F5, F6) separate the teeth (D1, D2, D3) and the gaps (C1, C2, C3), and the second stationary part (14) is configured to detect the teeth (D1, D2, D3), the gaps (C1, C2, C3) and the fronts (F1, F2, F3, F4, F5, F6) on the second target (16).

16. The method according to claim 15, further comprising the steps of:

detecting a first of the plurality of fronts;

recording, at the control unit, if the reference index is detected prior to the detection of a second of the plurality of fronts, a second count of the marks (8) on the first target detected between the detection of the first of the plurality of fronts and the detection of the reference index; and correlating, at the control unit, the second count with the engine timing.

17. The method according to claim 15, further comprising the steps of:

recording, at the control unit, a third count of marks detected between the starting position and the detecting of the at least one of the plurality of fronts; and if the third count is greater than a front threshold, calculating and storing the engine timing at the control unit.

18. The method according to claim 16, further comprising the steps of:

recording, at the control unit, a third count of marks detected between the starting position and the detecting of the at least one of the plurality of fronts; and if the third count is greater than a front threshold, calculating and storing the engine timing at the control unit.

19. The method according to claim 15, further comprising the steps of:

comparing, prior to the detection of the at least one of the plurality of fronts, a fourth count of the marks beginning at the starting position to a validity threshold; and if the fourth count is greater than the validity threshold, recording at the control unit an indication that the engine timing cannot be determined.

20. The method according to claim 16, further comprising the steps of:

comparing, prior to the detection of the at least one of the plurality of fronts, a fourth count of the marks beginning at the starting position to a validity threshold; and if the fourth count is greater than the validity threshold, recording at the control unit an indication that the engine timing cannot be determined.

* * * * *

UNITED STATES PATENT AND TRADEMARK OFFICE

CERTIFICATE OF CORRECTION

PATENT NO. : 7,475,682 B2     Page 1 of 1
APPLICATION NO. : 11/665608
DATED : January 13, 2009
INVENTOR(S) : Frédéric Galtier et al.

It is certified that error appears in the above-identified patent and that said Letters Patent is hereby corrected as shown below:

In column 7, line 24, the word "FS" should read as follows:

--F5--.

In column 8, beginning on line 5, claim 14 should read as follows:

--14. The method as claimed in claim 2, wherein the second target (16) is equipped with at least three teeth (D1, D2, D3) and three gaps (C1, C2, C3)--.

Signed and Sealed this

Nineteenth Day of May, 2009

JOHN DOLL
*Acting Director of the United States Patent and Trademark Office*